United States Patent [19]

Iida et al.

[11] Patent Number: 5,036,545
[45] Date of Patent: Jul. 30, 1991

[54] PICTURE IMAGE READING SYSTEM

[75] Inventors: Yoshihiko Iida; Mitsuru Ikeda; Ken Ishikawa, all of Chiba; Isao Horiba, Aichi, all of Japan

[73] Assignee: Hitachi Medical Corporation, Tokyo, Japan

[21] Appl. No.: 235,729

[22] Filed: Aug. 19, 1988

Related U.S. Application Data

[63] Continuation of Ser. No. 736,730, May 22, 1985, abandoned.

[30] Foreign Application Priority Data

May 22, 1984 [JP]   Japan ........................... 59-104271

[51] Int. Cl.[5] ........................................ G06K 9/00
[52] U.S. Cl. ................................. 382/62; 358/474; 382/50; 382/65
[58] Field of Search .............. 382/50, 52, 62, 65, 382/54; 358/282, 284, 464, 447, 465, 466, 474

[56]   References Cited

U.S. PATENT DOCUMENTS

| | | | |
|---|---|---|---|
| 3,104,372 | 9/1963 | Rabinow et al. | 382/50 |
| 3,166,743 | 1/1965 | Greenwald | 382/50 |
| 3,688,266 | 8/1972 | Watanabe et al. | 382/50 |
| 3,973,239 | 8/1976 | Kakumoto et al. | 382/50 |
| 4,054,916 | 10/1977 | Knop | 358/284 |
| 4,251,837 | 2/1981 | Janeway, III | 382/50 |
| 4,484,232 | 11/1984 | Gast | 358/284 |
| 4,491,964 | 1/1985 | Sanner | 382/50 |
| 4,520,505 | 5/1985 | Yamamoto et al. | 382/50 |
| 4,554,594 | 11/1985 | Ciardiello et al. | 358/282 |
| 4,575,768 | 3/1986 | Sakai et al. | 358/282 |

*Primary Examiner*—David K. Moore
*Assistant Examiner*—Joseph Mancuso
*Attorney, Agent, or Firm*—Sixbey, Friedman, Leedom & Ferguson

[57]   ABSTRACT

In a picture image reading system having a scanning system for scanning the surface of a picture image medium with light beams, an optical system for condensing the light beams transmitted through or reflected from the picture image medium and dividing the light beam into a plurality of light beams, and a plurality of density readers respectively responsive to the plurality of light beam where each density reader reads a predetermined ranges of density signals different from the ranges read by the remaining density readers, the improvement comprising a device for so establishing the density signal ranges read by the readers that adjacent density signal ranges partially overlap one another; a detecting device responsive to the density signals from the plurality of readers for detecting density signals occurring in overlapping portions where the density signal ranges of adjacent readers overlap and providing an overlap signal indicative of the occurrence; and a synthesizing device responsive to the density signals read from the plurality of readers and the overlap signal for connecting the density signals from the plurality of readers to synthesize a composite density signal corresponding to the entire density range of the picture.

12 Claims, 6 Drawing Sheets

PICTURE IMAGE READING SYSTEM

This application is a continuation of Ser. No. 736,730, filed 5.22.85 now abandoned.

BACKGROUND OF THE INVENTION

This invention relates to picture image reading systems and particularly to reading systems which divide a light beam transmitted through or reflected from a picture image medium such as an exposed X-ray film or an image plate into a plurality of light beams and read wide density regions where the wide density region is separated into a plurality of read-out density regions corresponding to the plurality of light beams for separate processing of the properties thereof.

In conventional picture image reading systems, a light beam passed through or reflected from a picture image film such as an X-ray film is divided into a plurality of light beams for the measurement of the properties of each, where each is converted into an electric signal. Each reader operates with, for instance, the quantity of light distributed among a plurality of readers or the quality of photoelectric conversion sensitivity being set different from each other where the readers read different density regions, respectively. Then the electric signals of the density readers each are connected and synthesized according to the sensitivity ratio of each density reader to effect density reading in a wide region.

However, the disadvantages of such a reading system include, because of difficulty in setting the sensitivity of each density reader and fluctuation in the read-out density data due to fluctuation in the sensitivity of the read-out density data in terms time or temperature, the read-out density data of adjoining read-out density regional portions of the density readers become discontinuous or overlap when the read-out density data are connected and synthesized, thus filing to connect and synthesize the read-out density data from the readers with accuracy.

SUMMARY OF THE INVENTION

Figure 1:
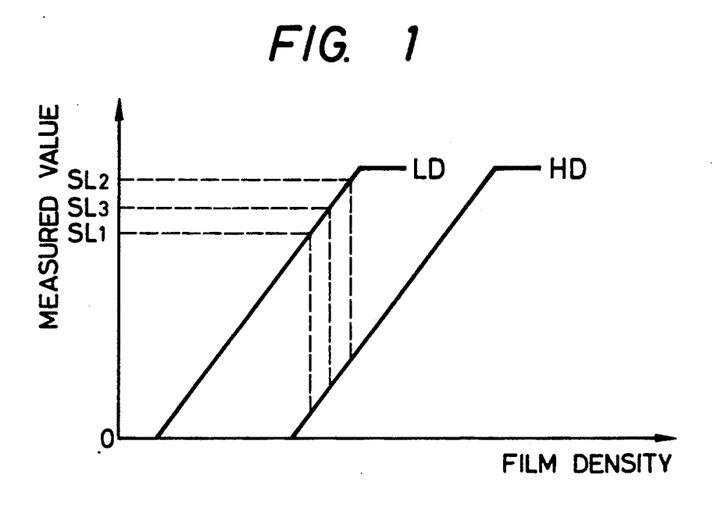
FIG. 1 is a graph illustrating the overlapping relation between the film density and the measured values of adjacent read-out density regions.

In the picture image reading system shown in FIG. 1, each density reader reads adjoining or overlapped read-out regional portions where the overlapped read-out regions consist of the read-out region on the low density side for the high density (HD) reader and the read-out region on the high density side for the low density (LD) reader. The low and high density data are read and the difference between the low and high density data is determined in the overlapped portions. Whether the LD and HD signals are in the overlapped portion is determined by utilizing the $SL_1$ and $SL_2$ thresholds. The high, low and difference density data is then used to synthesize the read-out density data for the whole read-out density region.

OBJECTS OF THE INVENTION

An object of the present invention to provide a picture image reading system capable of connecting and synthesizing read-out density data from readers and reading the density data of a continuous wide region.

Other objects and advantages of this invention will be apparent from a reading of the following specification and claims taken with the drawing.

DETAILED DESCRIPTION OF PREFERRED EMBODIMENTS OF THE INVENTION

Reference should be made to the drawing where like reference numerals refer to like parts.

Figure 2A:
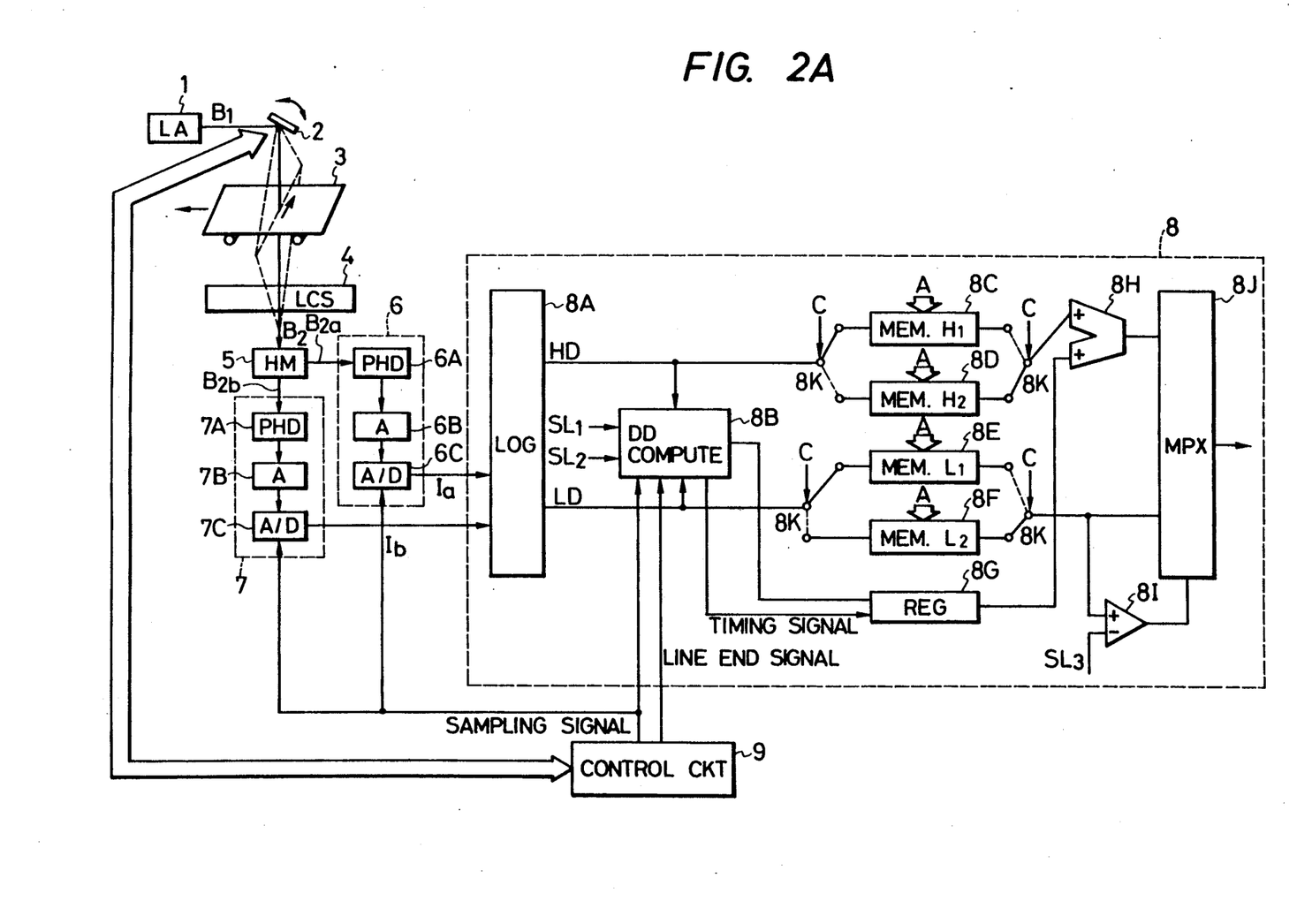
FIG. 2A is a block diagram of an illustrative image reader in accordance with the present invention.

In FIG. 2A, there is shown an arrangement of components comprising a laser light source 1; an optical system 2 for scanning the surface of an X-ray film 3 (hereinafter simply called the "film") in a predetermined linear direction with laser light beams $B_1$. The film 3 is moved by a film feeding mechanism (not shown) in the direction perpendicular to the scanning direction (to the left in the drawing), these constituting a scanning system for scanning the whole surface of the film 3 with light beams $B_1$; a condenser 4 for condensing the light beams $B_2$ that have passed through the film 3; a divider 5 for dividing the light beams $B_2$ condensed by the condenser 4 into a plurality of light beams $B_{2a}$ and $B_{2b}$; a high-density reader 6 comprising a photoelectric converter element 6A for receiving and converting the light beam $B_{2a}$, an amplifier 6B for amplifying the electric signal from photoelectric converter element 6A and an analog-to-digital (hereinafter simply "A/D") converter circuit 6C for converting the amplified electric signal into a digital signal Ia; a low-density reader 7 comprising a photoelectric converter element 7A for receiving and converting the light beam $B_{2b}$, an amplifier 7B for amplifying the electric signal from photoelectric converter element 7A and an A/D converter circuit 7B for converting the amplified electric signal into a digital signal Ib. The sensitivity or read-out ranges of the density readers 6 and 7 are overlapped so that the low density side of high density reader 6 overlaps the high density side of low density reader 7 as illustrated in FIG. 1.

A control circuit 9 is provided which controls the movement of a galvanometer (not shown) in optical system 2 and receives from the optical system data relating to line scanning status. The control circuit 9 produces line end pulses and sampling pulses based upon the data received from the optical system 2. The sampling pulses correspond to pixels along the scanning line. The line end pulse is produced whenever one line scanning is ended. The sampling pulses thus produced are applied to the A/D converters 6C and 7C.

The small light quantity data Ia and the large light quantity data Ib obtained from the high density reader 6 and the low density reader 7 are supplied to a logarithmic converter 8A of a picture image processor 8. Since the light quantity data applied to picture image processor 8 must be converted into density data, the following equation (1) is formulated between the quantity of light and the density.

$$D = log(Ii/Io) \ldots (1)$$

where D=density; Ii=incident quantity of light; and Io=transmitted or reflected quantity of light (output quantity of light).

As is obvious from the equation, the data of the quantity of the light produced from the high density reader 6 and the low density reader 7 and transmitted through film 3 are converted into logarithms by the logarithmic converter 8A to become density data and thus high density data HD and the low density data LD are obtained.

Before discussing image processor 8 in further detail, reference should be made to FIG. 5 where one overall method for implementing the invention is illustrated. In particular, a method is illustrated for connecting and synthesizing data by making them correspond to the high and low directions of the whole read-out density region from the high and low density data HD, LD. Assume high and low density readers 6 and 7 have read film 3 having a density distribution as shown in FIG. 5(a). High density data HD and low density data LD as shown in FIGS. 5(b) and 5(c) will be respectively obtained from the high and low density readers 6 and 7 according to the present invention. The overlapping region occurs between thresholds $SL_1$ and $SL_2$ where $SL_1$, $SL_2$ and $SL_3$ may be manually preset once the overlapping regions of readers 6 and 7 are determined. As will be described in more detail below, the high density data HD and the low density data LD are obtained for each pixel along a scanning line. For those pixels, if any, occurring in the overlapping region, the differences between the high density data HD and the low density data LD for such pixels are added and averaged to obtain a difference data MDD. Subsequently, the threshold $SL_3$ is used for discriminating between the high and low density data to thus select high density data HD or low density data LD where the averaged difference data MDD is added to the high density data HD for connection and synthesization. Thus, as shown in FIG. 5(d), it is possible to obtain the connected and synthesized data over a wide density region corresponding to the whole read-out density region of the high and low density readers 6, 7. Accordingly, the density data of a continuous wide region can be read out of various films.

In order to process density data occurring in the overlapping region, the high and low density data HD and LD are applied to a differential data (DD) computing circuit 8B where (LD−HD) are sequentially computed for every pixel, as will be described in more detail below with respect to FIG. 2B. The LD−HD differences are added and the resultant added values are divided by the number of pixels to obtain a mean value of summation of (LD−HD). The threshold values $SL_1$ and $SL_2$ are applied to the DD computing circuit 8B so that the above computation is implemented only when the measured value of the film density is above $SL_1$ but below $SL_2$. That is, the DD computing circuit 8B is operable only when portions of the film are readable by both the low density and high density readers. Further applied to the DD computing circuit 8B is the line end pulse produced from the control circuit 9. This pulse clears the DD computing circuit 8B and starts computation with respect to the next scanning line.

The mean value of the summation of (LD−HD) (hereinafter referred to as "MDD") is outputted from the DD computing circuit 8B and is applied to a register 8G in response to a timing signal fed from the DD computing circuit 8B so that the MDD is stored in the register 8G when the scanning of one line is terminated.

The high and low density data HD and LD are stored in memories 8C and 8E, respectively. While data is being read into memories 8C and 8E, data is being read out of memories 8D and 8F and vice versa, as will be described below. Address data A are applied to memories 8C through 8F to designate the addresses to be stored.

Address data is produced from a counter (not shown) in which the sampling pulses produced from control circuit 9 are applied to an up-count terminal thereof and the line end pulse also produced therefrom is applied to a clear terminal thereof Specifically, the counter is cleared when one line scanning is terminated and starts counting the number of pixels along the scanning line. The contents of the counter, therefore, indicates the address in memories 8C of data being read out by the high and low data readers.

Upon completion of reading one line, a control signal C is applied to change-over switches 8K so that the output of the memory 8C is applied to one input terminal of a digital adder 8H. To the other input terminal of the digital adder 8H, the output of the register 8G is applied. The output of the digital adder 8H is the summation of HD and MDD. The output of the digital adder 8H is applied to a multiplexer 8J. The output of the memory 8E is simultaneously applied to another input terminal of multiplexer 8J.

The multiplexer is switched between the outputs from adder 8H and memory 8E in accordance with the output from comparator 8I, the comparator having applied thereto the LD signal from memory 8E and the threshold signal $SL_3$.

Figure 5A:
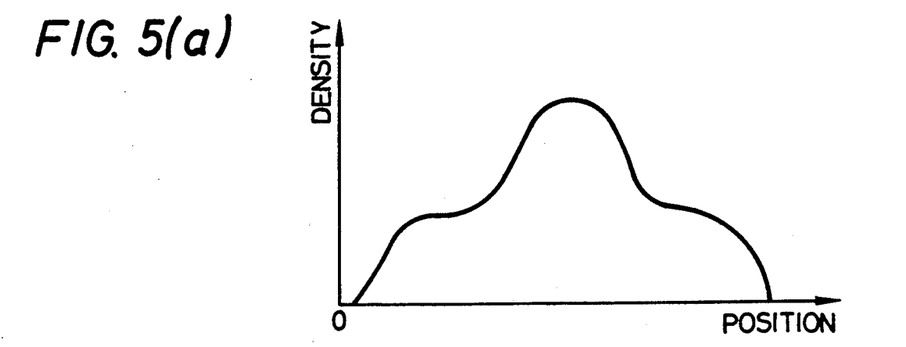
FIG. 5 indicates diagrams illustrating the method of connecting and synthesizing data correspondingly to the high and low directions of the whole read-out density region based on the high and low density data HD, LD.
Figure 5B:
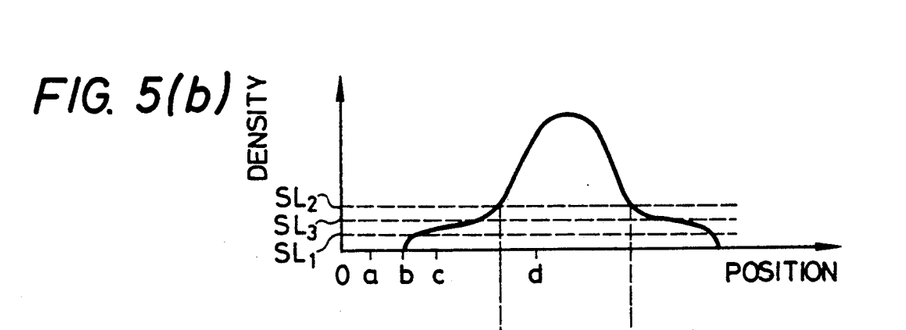
Figure 5C:
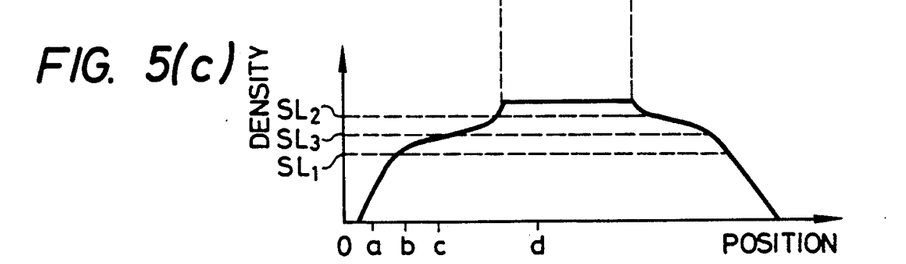
Figure 5D:
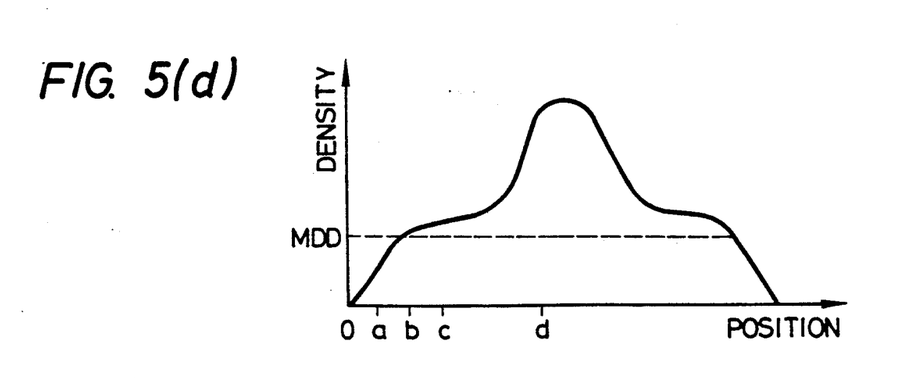

Reference should now be made to FIG. 5(d) for a more detailed description of the operation of the image reader 8 of FIG. 2A. Each of the FIGS. 5(b) and 5(c) (which respectively correspond to the HD and LD signals), correspond to a signal scan line on the film 3. Assume at pixel a, LD=3 and HD=0. Moreover, assume $SL_1=5$, $SL_3=6$, and $SL_2=7$. When data corresponding to pixel a is outputted from logarithmic converter 8A, the LD value of 3 will be stored in the memory address corresponding to pixel a. Assuming this is the fourth pixel on the scan line, the value of 3 will be stored in the fourth location of memory 8E. As will be brought out in more detail with respect to FIG. 2B, LD is used to determine whether the density readings from readers 6 and 7 are in the overlapping region thereof. In particular, LD must be between the $SL_1$ value of 5 and the $SL_2$ value of 7 in order for the density readings to be in the overlapping regions. Although the LD value is used to effect this determination, the HD value could also be used as indicated in FIG. 5(b). Since the value of LD at pixel a does not fall within the range established by $SL_1$ and $SL_2$, this completes the processing of the density data at pixel a.

Next assume the density data at pixel b is being processed and that $LD=5.1$ while $HD=0$. Since 5.1 is greater than $SL_1=5$, the DD computer 8B will be actuated to determine the differen and HD signals. Assuming the density data at pixel b is the first to occur in the overlapping ranges of the readers 6 and 7, no further processing of the $LD-HD$ difference signal will occur in computer 8B at this time. Of course, the HD and LD signals will also be read into the memory locations of memories 8C and 8E corresponding to the position of pixel b along the scan line.

Next assume at pixel c the value of $LD=6.1$ and $HD=1.6$. These values will be read into memories 8C and 8E at the locations corresponding to the position of pixel c. Moreover, since 6.1 falls within the range established by $SL_1$ and $SL_2$, DD computer 8B will be actuated to compute the difference between 6.1 and 1.6, this difference being 4.5. This value of 5.1 is added to the previously calculated $LD-HD$ values and the average or mean of all the calculated $LD-HD$ values is calculated as the MDD signal and applied to register 8G. Thus, register 8G is updated each time a new $LD-HD$ signal is calculated so that at the end of a scan line the register 8G contains the mean of all $LD-HD$ calculations made for that line.

At pixel d of FIG. 5(c), assume $LD=7.5$ and $HD=6$. Again these values are respectively stored in the memory locations of memories 8C and 8E corresponding to the position of pixel d. Moreover, since $LD=7.5$ is out of the range established by thresholds $SL_1$ and $SL_2$, the DD computer 8D is not actuated.

In the foregoing manner, the memories 8C and 8E are accessed each time the density data associated with successive pixels of the scan line are processed. Moreover, the register 8G is also updated, as described above so that it contains the MDD signal for the entire scan line at the end of each scan line. At this time the positions of contol switches 8K are switched by control signal C. And the locations of memories 8C and 8E are successively outputted. Assume the fourth memory location corresponding to pixel a has been reached. The HD value of 0 will be applied to one input of adder 8H as will the value of MDD to the other input thereof. As can be appreciated, MDD is applied to the other input of adder 8H for all memory locations of memories 8C and 8E. Assume the value of MDD at this time is 5.0. The LD value of 3 is applied to multiplexer 8J. It is also applied to comparator 8I where it is compared with the value of $SL_3=6$. The output of the comparator remains low which, in turn, controls multiplexer 8J to output the $LD=3$ output from memory 8E and thus the synthesized output, as indicated in FIG. 5(d) at pixel a will be $LD=3$.

At pixel b, the value of $LD=5.1$, which again will not exceed the $SL_3$ threshold of comparator 8I and thus the LD signal will again be employed as the output of the multiplexer and utilized in the synthesized signal of FIG. 5(d). At pixel c, the value of LD is 6.1 and thus, the threshold of comparator 8I is exceeded to switch the output of the multiplexer 8J to the output of adder 8H. Applied to adder 8H at this time are $HD=1.6$ and $MDD=5$ which, of course, totals 6.6. Thus, the synthesized output from multiplexer 8J corresponding to FIG. 5(d) is 6.6. At pixel (d) $LD=7.5$ and thus again the threshold of comparator 8I is exceeded to switch the output of adder 8H to the output of the multiplexer.

Applied to the adder are $HD=6$ and $MDD=5$ which totals 11. Thus, the synthesized output at pixel D is 11 as generally indicated in FIG. 5(d).

In the foregoing manner it can be seen how the image reader 8 synthesizes and connects the signals from readers 6 and in such a manner as to avoid the discontinuities associated with the prior art. While the density data stored in memories 8C and 8E is being outputted to multiplexer 8J for synthesis, the density data associated with the next scan line is being loaded into memories 8D and 8F. In this manner, successive scan lines along film 3 can be continuously processed.

A more detailed description of the DD computing circuit 8B will now be given with reference to FIG. 2B. An overlap detector 85, which is described in more detail in FIG. 2C, is provided to which the low density data LD and the two threshold values $SL_1$ and $SL_2$ are applied. The detector 85 detects overlapping pixels read out by both the high and low density readers. Based upon these inputs applied to the detector 85, an output indicative of the overlapping condition is produced therefrom and is applied to a gate circuit 86. The latter circuit 86 receives the sampling pulses from control circuit 9 and is enabled in response thereto. The output of the detector 85 is applied through gate circuit 86 to a clock terminal (CK) of a register 83. The register 83 is provided with a clear terminal (CLR) to which the line end pulse produced from control circuit 9 is applied. Thus, the register 83 is cleared in response to the line end pulse and is placed in a condition that an input from the previous stage is stored in synchronization with the sampling pulses.

The output of detector 85 is also applied through gate circuit 86 to the up-count terminal of a counter 87. To the clear terminal of the counter 87, the line end pulse. is applied to thereby clear the content of the counter when one line scanning is terminated. Therefore, the counter 87 which has been cleared in response to the line end pulse performs up counting when the output from the gate 86 is received in the up-count terminal thereof. The output of the counter 87 indicates the number of pixels present along the scanning line in the overlapping regions read out by the high and low density readers.

The high and low density data HD and LD are applied to negative and positive terminals of a digital subtractor 81, respectively, with which $(LD-HD)$ is computed for each of the pixels. The output of the digital subtractor 81 is applied to one positive terminal of a digital adder 82, the output of which is connected to the register 83 in which the summation of $(LD-HD)$ is stored.

The output of the register 83 is applied to one input terminal of a divider 84. To the other input terminal of the divider 84, the output of the counter 87 is applied. In the divider 84, the output of the register 83 indicating the summation of the values of $(LD-HD)$ is divided by the number of pixels which are read by both the high and low density readers. Thus, the output of the divider 84 indicates MDD. The MDD thus obtained is applied to the register 8G. The register 8G is preset to a preset data in response to a preset signal which is produced upon detection of the rising edge of a power supply voltage when a power supply is actuated.

A comparator 88 is connected to the output of the counter 87, in which the output of the counter and zero (0) is compared. When an overlapping portion does not occur for a scan line, a zero signal is produced from the comparator 88 to a gate circuit 89, whereby the gate circuit 89 is disabled. In this case, the register 8G holds the MDD data from the previous scan.

Figure 2B:
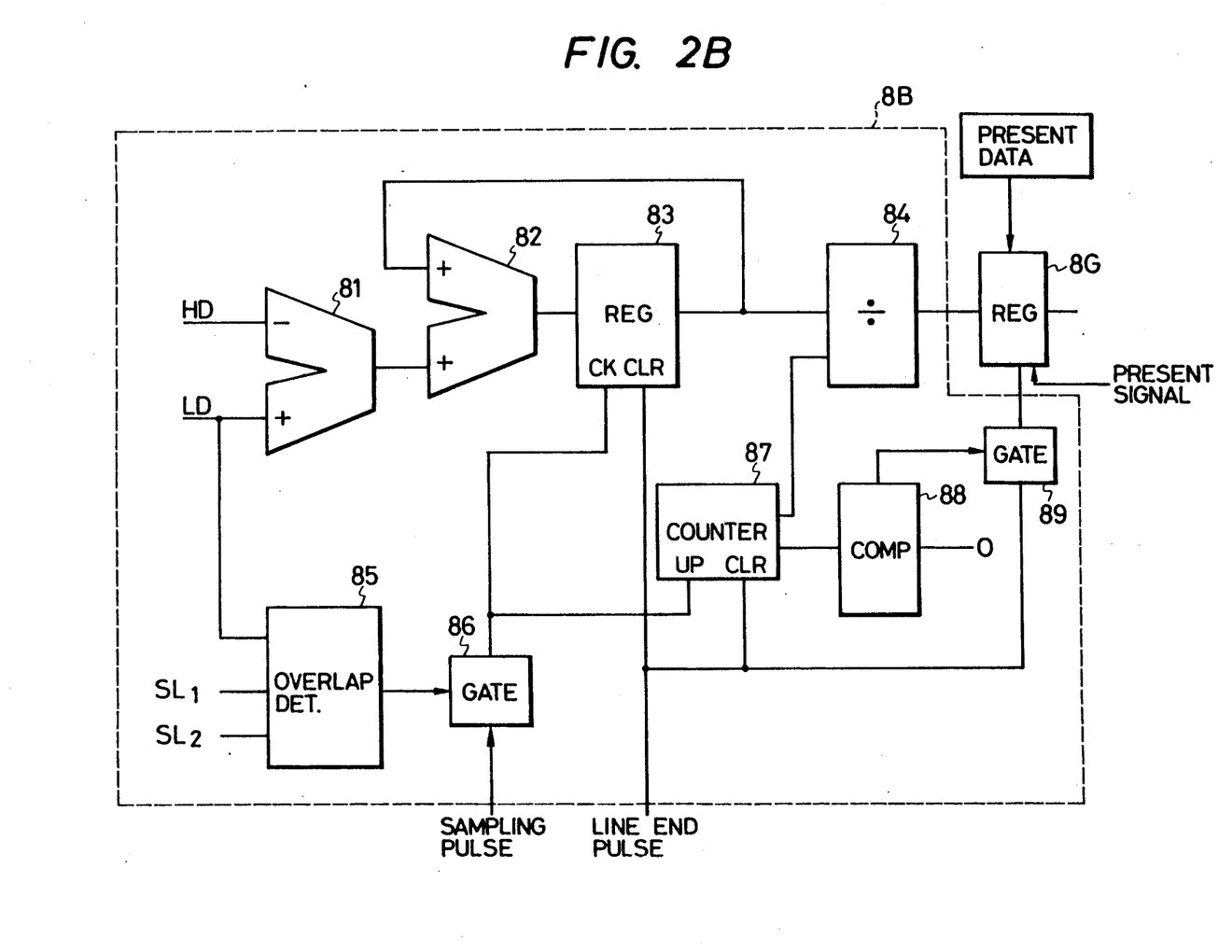
FIG. 2B is a block diagram of an illustrative differential data computing circuit for use in the image reader of FIG. 2A.
Figure 2C:
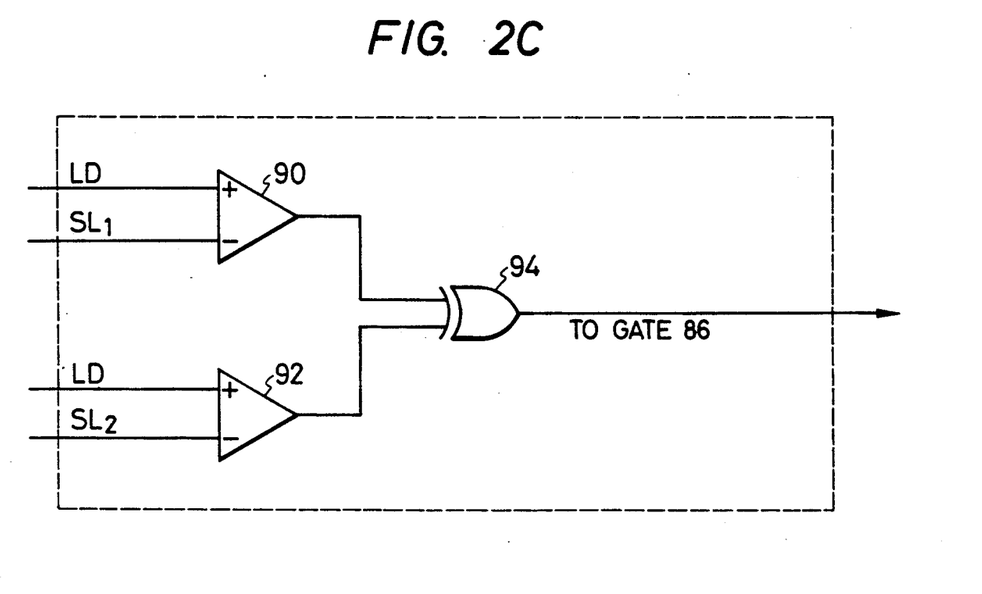
FIG. 2C is a block diagram of an illustrative overlap detector 85 for use in the differential data computing circuit of FIG. 2B.

Referring now to FIG. 2C, there is shown in greater detail the circuit elements comprising overlap detector 85 of FIG. 2B. In particular, these elements constitute comparators 90 and 92 and exclusive OR gate 94 where the comparator 90 has connected to the positive terminal thereof the LD signal and to the negative terminal thereof the $SL_1$ signal, comparator 92 has connected to its positive terminal LD and $SL_2$ to its negative terminal and the outputs of the comparators are connected as inputs to the exclusive OR gate. In operation, assume again the values of the LD signals at pixels a through d in FIG. 5(c) are $-3$, 5.1, 6.1, and 7.5 respectively and that the threshold values $SL_1$ and $SL_2$ are 5 and 7 respectively. When LD=3, as at pixel a, the thresholds of neither of the comparators 90 and 92 are exceeded and thus both of the outputs thereof are low, a condition which will not satisfy the exclusive OR gate 94. Accordingly, no output signal is provided from circuit 94 indicating that LD is not within the range established by the thresholds $SL_1$ and $SL_2$—that is, the overlapping regions of the readers 6 and 7.

At pixel b, LD=5.1 and this does fall within the range established by the thresholds. In particular, the $SL_1$ threshold of 5 will be exceeded and thus the output of comparator 90 will go high while the output of comparator 92 will remain low since the threshold $SL_2=7$ is not exceeded. Accordingly, the conditions for exclusive OR gate 94 are satisfied and a signal is thus applied to gate 86 to indicate the value of LD is in the overlapping regions of the readers 6 and 7. At pixel c, LD=6.1. Thus, the operation of the overlap detector 85 is exactly the same as that described for pixel b. At pixel d, LD=7.5 which is greater than the 5 to 7 range established by $SL_1$ and $SL_2$. Thus both of the thresholds for comparators 90 and 92 will be exceeded whereby both of the outputs will be high and again the conditions to satisfy the exclusive OR circuit 94 will not be satisfied. Accordingly, MDD will not be recomputed for pixel d.

Although the mean value of the difference data (MDD) may be calculated in the above embodiment as described above, the following means may also be used:

(1) The mean value of the difference data is calculated on a film picture image area by changing the area where the mean value of the difference data is obtained or the mean value of the difference data is computed after the whole film picture image has been read out;

(2) The difference data is obtained by data of the overlapped density regions without obtaining the mean value of the difference data, difference data being obtained by interpolating the difference data;

(3) Calculated data such as the mean value obtained from the read-out density data is utilized as the threshold value data $SL_3$ for the selection of the high and low density data; and (4) The DD computer 8B and adder 8H in the picture image processor may be operated according to data on either the high or low density side.

Figure 3:
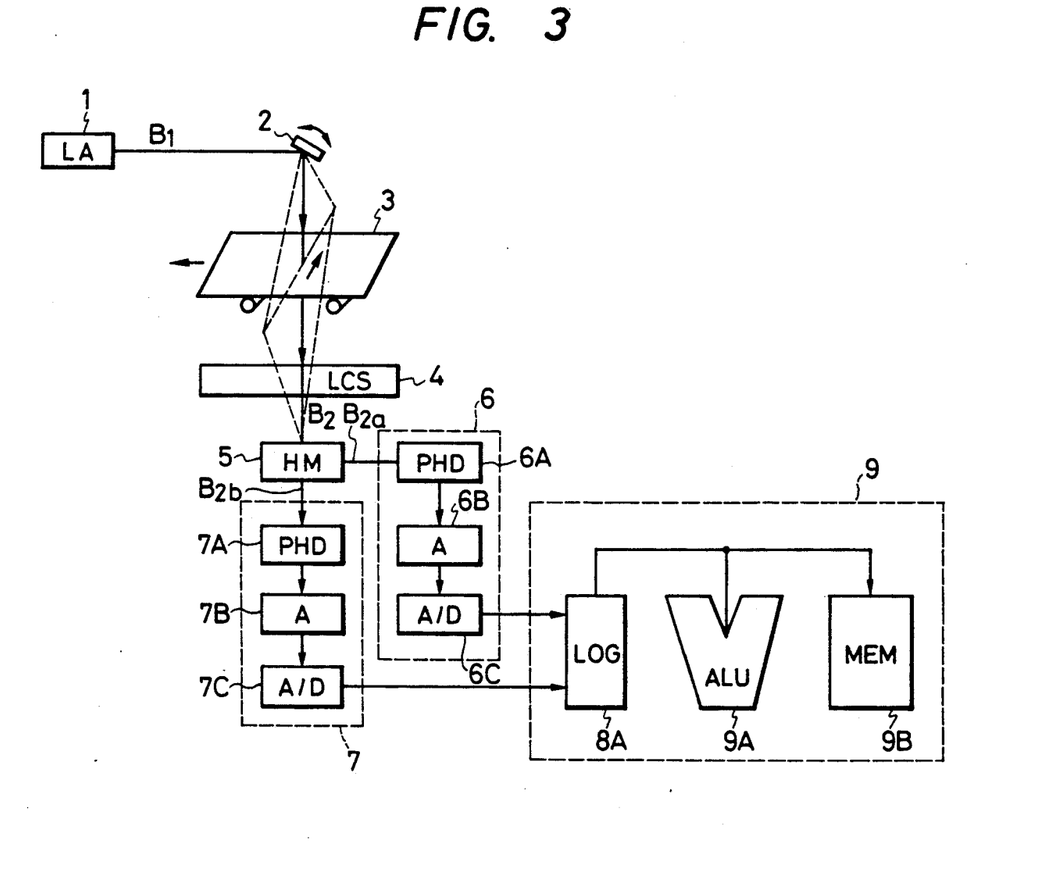
FIG. 3 is a block diagram of a further illustrative embodiment of a picture image reader in accordance with the present invention.
Figure 4:
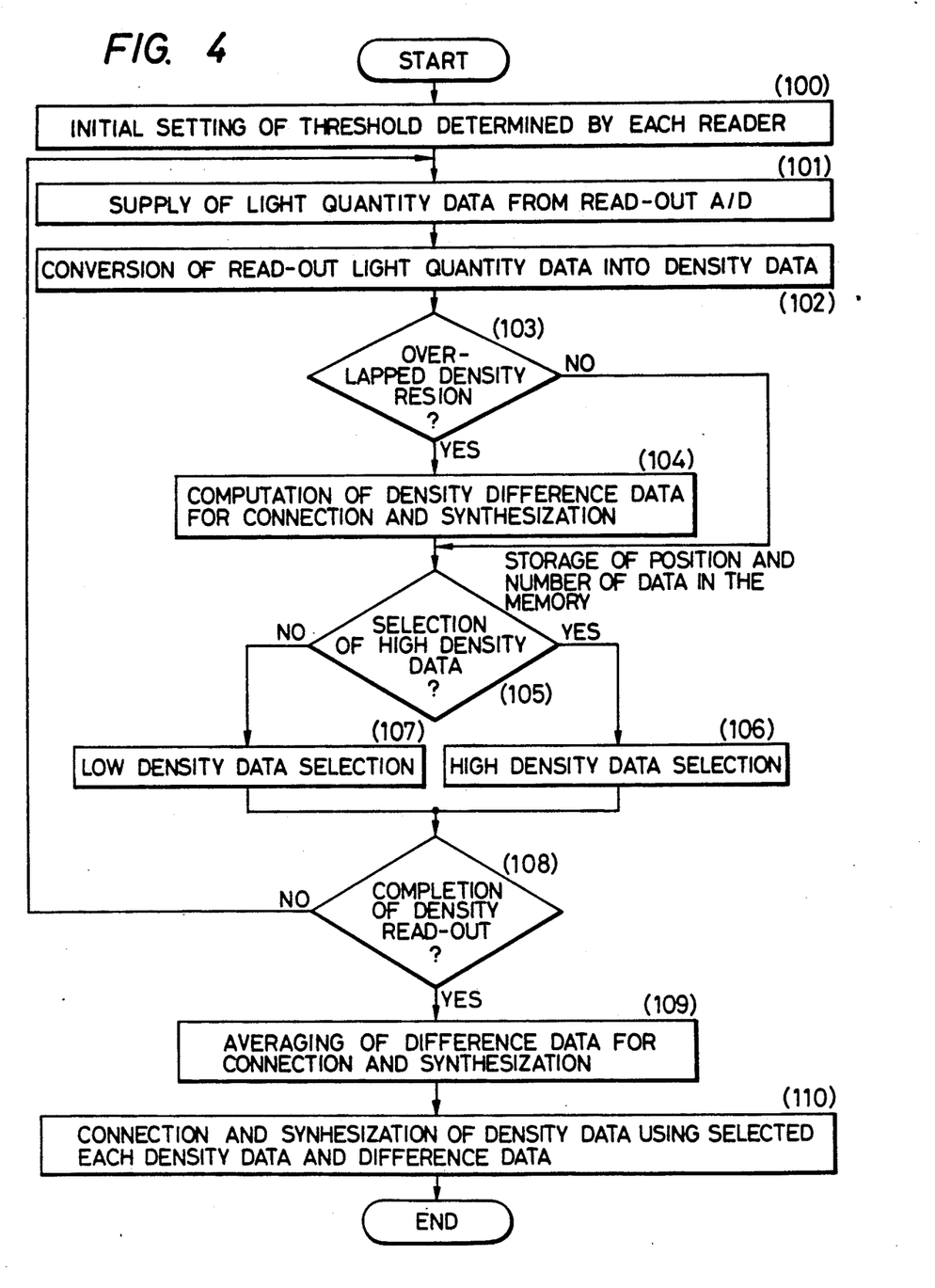
FIG. 4 is a flowchart of the operation of the above-described embodiment and illustrative of the connection and synthesization of data in the whole read-out density region based on the data from each density reader.

FIG. 3 is a block diagram of another illustrative picture image reader emboding the present invention and FIG. 4 is a flowchart explanatory of the operation thereof.

In FIG. 3, like reference characters designates like components of FIG. 2, so that the repetition of description thereof may be avoided.

As shown in FIG. 3, the embodiment of a picture image reader employs a picture image processor 9 with a general purpose computer instead of the picture image processor 8 of FIG. 2. The picture image processor 9 comprises a logarithmic converter 8A for converting the small and large light quantity data Ia, Ib read by the high and low density readers 6 and 7 into high (HD) and low (LD) density data, a computing element 9A for performing the operation of synthesizing data corresponding to the overlapping portions of adjacent read-out portions of the whole read-out region of the readers and a picture image memory 9B.

The operation of the embodiment of the reader will now be described with respect to FIG. 4. With respect to the processing of the small and large light quantity data Ia and Ib obtained from the high and low density readers 6 and 7, the high and low density readers respectively write to memory 9B (100) thresholds corresponding to (a) overlapping read-out density regional portions, that is, the density regional portion on the low density side for the high density reader 6 and the density regional portion on the high density side for the low density reader 7, and (b) the entire film read-out region. Each light quantity data corresponding to the film 3 density and produced from each of the density readers 6 and 7 is inputted to the picture image processor 9 (101). At this time, the relation expressed by the above-described equation (1) is generally formulated between the read out light quantity data Ia, Ib and the film density.

Accordingly, there is effected logarithmic conversion for converting the light quantity into a density (102). Of the high and low density data HD, LD, one of the data, for instance, the low density data LD is compared with the thresholds $SL_1$ and $SL_2$ to decide whether or not it is within the overlapped density read-out region (103). If it is within the region, the difference data DD=LD−HD of the density data for connection and synthesization will be computed. Then the places (that is, the pixels where overlapping has occurred) for connection and synthesization and the number of them are stored in the picture image memory 9B (104). If the density at a pixel is not within the overlapping region, whether it is within a high or low density region is decided using one of the density data, for instance, the low density data LD based on the threshold $SL_3$ (105). If it is within the high density region, the high density data HD and the address thereof are stored in the picture image memory 9B (106). If it is not within the high density region, the low density data LD is stored in the picture image memory 9B. Whether the read-out region of the film 3 has been completely read out is decided (108). The mean value MDD within the region where the difference data MDD and the selected density data LD, HD are connected and synthesized (110). In other words, they are connected and synthesized correspondingly to the high and low directions of the whole read-out density region using the equations D=LD (low density region data) and HD+MDD (high density region data).

In this embodiment of the invention, although the difference data DD are averaged in the read-out region, there are additional methods usable for individually connecting and synthesizing data in each overlapped read-out density region, averaging and connecting and synthesizing the difference data DD in the read-out region of each overlapped read-out density region and functionally approximating fluctuations in the difference data DD in the read-out region.

As set forth above, the novel art and means disclosed by the present invention bring about the following effects:

(1) In a picture image reader which divides a light beam transmitted through or reflected from a picture image medium such as an exposed X-ray film and an image plate into a plurality of light beams and reading a wide density region by measuring each light beam in terms of read-out density regions separated from and adjacent each other, the improvement constitutes providing high and low density readers where (a) the adjoining read-out density regional portions are overlapped with the read-out density regions each being divided into high and low directions and (b) predetermined density thresholds in the overlapped read-out density region are provided. When the density is within the overlapping range established by the threshold, difference density data is computed and so utilized that when the data read by the readers through the picture image medium are connected and synthesized correspondingly to the high and low directions of the whole read-out density region of the reader, the density data read by each density reader can have fluctuation, etc. removed therefrom because of the correlation of the readers.

(2) The density data in a continuous wide region can be read out, because the read-out data from each density reader can be accurately connected and synthesized.

Although the embodiments of the invention above have been described as those applicable to film picture image readers, they are needless to say applicable to picture image media such as image plates.

It will be obvious that the present invention is not limited to the above-described embodiments and modification of the invention is possible within its spirit and scope as set out in the accompanying claims.

What is claimed is:

1. In a picture image reading system having a scanning system for scanning the surface of a picture image medium with light beams, an optical system for condensing the light beams received from said picture image medium and dividing the light beam into a plurality of light beams, and a plurality of density readers respectively responsive to said plurality of light beams where each density reader reads a predetermined range of density signals different from the ranges read by the remaining density readers, the improvement comprising
means for establishing the density signal ranges read by the readers such that adjacent density signal ranges partially overlap one another with a high end of one of the adjacent density signal ranges overlapping a low end of another one of the adjacent density signal ranges;
detecting means responsive to the density signals from said plurality of readers for detecting occurrence of density signals in overlapping portions at density signal ranges where the density signal ranges of adjacent readers overlap and providing an overlap signal indicative of said occurrence; and
synthesizing means responsive to the density signals read from said plurality of readers and said overlap signal for connecting the density signals from the plurality of readers to synthesize a composite density signal corresponding to the entire density range of the picture.

2. The improvement as in claim 1 where said plurality of readers includes at least two readers where the density signal range read by the first of the readers corresponds to a low density (LD) range and the density signal range read by the second reader corresponds to a high density (HD) range adjacent to and partially overlapping said LD range, the HD range being higher than the LD range and where said overlap signal is a function of a differential density (DD) signal corresponding to the difference between the HD and LD signals occurring in said overlapping portions.

3. The improvement as in claim 2 where said overlap signal is a function of the mean of said DD signal over at least a portion of said picture image medium to thus form a mean differential signal (MDD).

4. The improvement as in claims 2 or 3 where said synthesizing means includes means for adding said overlap signal to one of said HD and LD signals for forming a first partial composite signal, the remaining one of said HD and LD signals being a second composite output signal means for comparing said remaining signal to a threshold; and means for switching one or the other of said partial composite signals to the output of the synthesizing means in response to whether the said remaining signal exceeds said threshold to thus effect the synthesis of the composite signal.

5. The improvement as in claim 4 where said overlap signal is added to said HD signal and said LD signal is compared to said threshold.

6. The improvement as in claim 5 where said threshold is representative of a signal density occurring within said overlapping portion.

7. The improvement as in claim 5 where said first partial composite signal is the sum of the MDD and HD signals and said second partial composite signal is the LD signal.

8. The improvement as in claim 1 detecting means and said synthesizing means include a programmed computer.

9. The picture image reading system of claim 1, wherein the synthesizing means includes means for adding a first value to density signals read by a first reader, and means for comparing density signals read by a second reader to a threshold value;
said synthesizing means further including composite forming means for selecting density signals from said second reader when the density signals from said second reader are below the threshold value, and for selecting the sum of the first value and the density signals read from the first reader when the density signals read by the second reader exceed the threshold value.

10. The picture image reading system of claim 9, further including means for calculating said first value by averaging differences between density signals of said first reader and said second reader within the overlapping density range portion.

11. A device for forming a composite density signal comprising:
first and second density readers, wherein said readers read different density ranges;
adding means for adding a first value to density signals read by said first density reader to provide a partial composite density signal;
means for comparing density signals read by said second density reader to a threshold value; and
composite selecting means for selecting values for said composite from said partial composite where the signals read by said second density reader exceed the threshold value, and for selecting values for said composite from the density signals read by said second density reader where the signals read by the second density reader are below aid threshold value.

12. The device of claim 11, wherein said first and second readers read different ranges of density signals with portions of the respective ranges overlapping, said device further including means for calculating said first value by averaging differences between density signals of said first and second readers over density signal ranges of said first and second readers which overlap.

* * * * *